United States Patent Office 2,862,907
Patented Dec. 2, 1958

2,862,907

SUSPENSION PROCESS FOR THE POLYMERIZATION OF VINYLIDENE AROMATIC HYDROCARBONS HAVING RUBBERY CONJUGATED 1,3-DIENE POLYMERS DISSOLVED THEREIN

Alvin Stein and Robert L. Walter, Springfield, Mass., assignors to Monsanto Chemical Company, St. Louis, Mo., a corporation of Delaware No Drawing. Application April 1, 1957
Serial No. 649,596

6 Claims. (Cl. 260—45.5)

The present invention relates to an improved process for polymerizing vinylidene aromatic hydrocarbon and ring-halogenated vinylidene aromatic hydrocarbon monomers having rubbery conjugated 1,3-diene polymers dissolved therein by a suspension polymerization process. In the subsequent description of this invention, for the sake of brevity, the vinylidene aromatic hydrocarbon or ring-halogenated vinylidene aromatic hydrocarbon monomer solution of the rubbery conjugated 1,3-diene polymer frequently will be referred to simply as the "vinylidene aromatic hydrocarbon solution" or the "vinylidene monomer solution."

Processes for preparing polymers from vinylidene aromatic hydrocarbon or ring-halogenated vinylidene aromatic hydrocarbon monomers having rubbery conjugated 1,3-diene polymers dissolved therein by suspension polymerization processes are known. See the co-pending application of John B. Ott, Serial No. 573,074, filed March 22, 1956, and our two co-pending applications Serial No. 649,594, and Serial No. 649,595, both filed of even date herewith. In these processes, the vinylidene monomer solution is dispersed and polymerized in an aqueous medium containing as the dispersing agent either certain water-soluble interpolymers of 93.5–98.5 mol percent of an acidic monomer of the group consisting of acrylic acid, methacrylic acid, and mixtures thereof and, correspondingly, 6.5–1.5 mol percent of a monomer of the group consisting of 2-ethylhexyl acrylate, 2-ethylhexyl methacrylate and mixtures thereof or a binary mixture of such a water-soluble interpolymer and a bis(sulfoaryl) alkane. In the preferred embodiments of the previously described methods, the vinylidene monomer solution is partially polymerized before being dispersed in the aqueous medium containing the dispersing agent.

There are minor difficulties associated with the above-described processes, which difficulties, although not affecting the quality of the polymer product obtained, do increase the cost of manufacturing the polymer. The first of these difficulties is that a substantial percentage of the polymer particles formed in the polymerization float in the aqueous dispersing medium. These floating particles cannot be separated from the aqueous dispersing medium by centrifuging in contiguous centrifuges of the popular "solid bowl" type, which for many reasons is the most desirable method for recovering the polymer particles. The second difficulty is that the polymer particles occlude substantial quantities of water and are costly to dry.

It is an object of this invention to provide an improved process for the suspension polymerization of vinylidene aromatic hydrocarbon and ring-halogenated vinylidene aromatic hydrocarbon monomers having a rubbery conjugated 1,3-diene polymer dissolved therein.

Another object of this invention is to provide an improved process for the suspension polymerization of vinylidene aromatic hydrocarbon and ring-halogenated vinylidene aromatic hydrocarbon monomers having a rubbery conjugated 1,3-diene polymer dissolved therein in which substantially all of the polymer particles will sink in the aqueous dispersing medium.

A further object of this invention is to provide an improved process of the suspension polymerization of vinylidene aromatic hydrocarbon and ring-halogenated vinylidene aromatic hydrocarbon monomers having a rubbery conjugated 1,3-diene polymer dissolved therein in which the polymer particles will occlude relatively small quantities of water.

Other objects and advantages of this invention will be apparent from the following detailed description thereof.

The above and other objects are obtained by (1) agitating and heating a mixture of water and a partially polymerized solution of a rubbery conjugated 1,3-diene polymer in a vinylidene monomer of the group consisting of a vinylidene aromatic hydrocarbon monomer, a ring-halogenated vinylidene aromatic hydrocarbon monomer and mixtures thereof to a temperature of at least about 110° C. in the absence of a dispersing agent, (2) adding to said mixture of water and partially polymerized vinylidene monomer solution, as a dispersing agent, either a water-soluble interpolymer consisting of 93.5–98.5 mol percent of an acidic monomer of the group consisting of acrylic acid, methacrylic acid and mixtures thereof, and, correspondingly, 6.5–1.5 mol percent of a monomer of the group consisting of 2-ethylhexyl acrylate, 2-ethylhexyl methacrylate and mixtures thereof or a binary mixture of such a water-soluble interpolymer and a bis(sulfoaryl) alkane and (3) continuing to agitate and heat said mixture of water and partially polymerized vinylidene monomer solution until the vinylidene monomer is substantially completely polymerized. The partially polymerized solution of the rubbery conjugated 1,3-diene polymer in the vinylidene monomer employed in the process is characterized by (1) having at least about 15% of the monomeric constituents of the vinylidene monomer solution polymerized and (2) having a viscosity of at least about 40 poises at 40° C.

The following examples are set forth to illustrate more clearly the principle and practice of this invention to those skilled in the art. Where parts are mentioned, they are parts by weight.

Example I

To a glass lined, stirred autoclave are charged 100 parts of freshly distilled water and 100 parts of a partially polymerized styrene solution of a rubbery butadiene-styrene interpolymer. The styrene solution contains 6 parts of an interpolymer of 75% butadiene and 25% styrene dissolved in 94 parts of styrene monomer together with 0.05 part of ditertiary butyl peroxide, 0.3 part of an anti-oxidant, 0.1 part of a commercial $C_{12}$ mercaptan modifier and 2.0 parts of a refined hydrocarbon oil lubricant. Thirty-three percent of the styrene monomer is polymerized and the partially polymerized solution has a viscosity of approximately 120 poises at 40° C.

The reaction mixture is placed under nitrogen pressure and agitated and heated to 110° C. for 15 minutes and there is then charged thereto 20 parts of water having dissolved therein 0.25 part of the sodium salt of bis(sulfonaphthyl) methane, 0.1 part of calcium chloride and 0.13 part of an interpolymer of 95.5 mol percent of acrylic acid and 4.5 mol percent of 2-ethylhexyl acrylate which has a specific viscosity of about 4.0 as determined in a 1% solution at 25° C. Thereafter, the reaction mixture is agitated and heated for 3 hours at 130° C. and 5 hours at 140° C. The polymer is obtained in substantially quantitative yield in the form of homogeneous small spherical beads. Essentially all of the polymer particles obtained are heavier than water and can be separated from the aqueous dispersing medium in a continuous "solid bowl" type centrifuge. The water content of the recovered polymer particles is less than 7%.

Comparative Example I

Example I is repeated except that before charging the dispersing agents to the system, the water and the partially polymerized styrene monomer solution of the rubbery butadiene-styrene interpolymer are heated for 15 minutes at 105° C. in lieu of the 110° C. employed in Example I. The polymer obtained in this example contains approximately 28 weight percent of particles which float in the aqueous dispersing medium. These floating polymer particles cannot be separated from the aqueous dispersing medium in a continuous "solid bowl" type centrifuge. The moisture content of the polymer particles is 9%.

Comparative Example II

Comparative Example I is repeated except that before charging the dispersing agents to the system, the water and the partially polymerized styrene monomer solution of the rubbery butadiene-styrene polymer are heated for 15 minutes at 90° C. Thirty-five percent of the polymer particles float in the aqueous dispersing medium and cannot be separated therefrom in a continuous "solid bowl" type centrifuge. The moisture content of the polymer is 14%.

Example II

Example I is repeated except that the polymerizable composition employed comprises 20 parts of an interpolymer of 75% butadiene and 25% styrene dissolved in 80 parts of styrene monomer. Comparable results are obtained.

Example III

Example I is repeated except that 6 parts of an interpolymer of 75% butadiene and 25% styrene are dissolved in a monomer mixture consisting of 84 parts styrene monomer and 10 parts alpha methylstyrene monomer. Comparable results are obtained.

Example IV

Example I is repeated except that 6 parts of an interpolymer of 75% butadiene and 25% styrene are dissolved in a monomer mixture consisting of 66 parts styrene monomer and 28 parts acrylonitrile monomer. Comparable results are obtained.

In the initial step of the invention, water and a partially polymerized vinylidene monomer solution of critical characteristics are agitated and heated to a temperature of at least 110° C. in the absence of dispersing agents. The partially polymerized vinylidene monomer solution employed is characterized in that at least about 15% of the original monomeric components of the solution are polymerized and the solution has a viscosity of at least 40 poises at 40° C. In carrying out this initial step of the process, it is customary to charge the entire quantity of water that will be employed in the suspension polymerization step, except for a small quantity of water that may be withheld and employed as a solvent for the dispersing agent that is ultimately added to the system. In nearly all cases, the quantity of water employed should constitute at least about 35% or more preferably at least 50% of the weight of the partially polymerized vinylidene monomer solution. The period of contact between the vinylidene monomer solution and the water may be quite brief as very noticeable benefits are obtained when this period is as short as about 10 minutes.

In one embodiment of the invention, the vinylidene monomer solution is partially polymerized en masse before being employed in the process of this invention. In an alternate embodiment of the invention, the unpolymerized vinylidene monomer solution and water are charged to a reactor and heated and agitated until the vinylidene monomer solution has been partially polymerized to the extent previously indicated. If this polymerization is carried out at a temperature of 110° C. or higher, the dispersing agent may be added to the system as soon as the requisite conversion of the vinylidene monomer solution is obtained. If, however, this initial polymerization is carried out at a temperature of less than 110° C., the mixture of water and the partially polymerized vinylidene monomer solution should be agitated and heated for a short period of time at a temperature of at least 110° C. before the dispersing agent is added to the system.

After the initial step of agitating and heating the water and the partially polymerized vinylidene monomer solution in the absence of dispersing agents is completed, a dispersing agent of a restricted class is added to the aqueous phase and the polymerization is completed in the usual manner. The dispersing agents employed are water-soluble interpolymers of an acidic monomer of the group consisting of acrylic acid, methacrylic acid and mixtures thereof and a monomer of the group consisting of 2-ethylhexyl acrylate, 2-ethylhexyl methacrylate and mixtures thereof. For the purposes of this invention, such interpolymers are considered to be water-soluble if 0.5 part of the interpolymer will dissolve in 99.5 parts of water at 25° C. Such interpolymers should contain 1.5–6.5 mol percent and preferably 2.0–5.0 mol percent of the 2-ethylhexyl ester with the balance of the interpolymer being the acidic monomer. For reasons of both cost and performance, it is preferred to employ interpolymers of acrylic acid and 2-ethylhexyl acrylate.

The dispersing action of the water-soluble interpolymers is affected but slightly by wide variations in molecular weight. The preferred dispersing agents, however, have specific viscosities of at least 0.1 when methacrylic acid is the acidic monomer included in the interpolymer and at least about 0.8 when acrylic acid is the acidic monomer included in the interpolymer. Both of the above specific viscosity values are determined in 1% solutions in water at 25° C. in accordance with the well-known formula:

$$\text{Specific viscosity} = \frac{\text{Solution viscosity} - \text{solvent viscosity}}{\text{Solvent viscosity}}$$

Methods for preparing such water-soluble dispersing agents are described in detail in the co-pending application of John B. Ott, Serial No. 573,069, filed March 22, 1956, and that description is incorporated herein by reference. The preferred process for synthesizing the water-soluble dispersing agents comprises dissolving an appropriate monomer mixture and a free radical generating polymerization initiator in an organic liquid which is a solvent for the monomer mixture, but a non-solvent for the interpolymer prepared therefrom and heating to effect polymerization.

Usually only a small concentration of the dispersing agent is necessary, 0.02–1.0% and more particularly 0.05–0.5% based upon the amount of water used is usually sufficient. Frequently, there is found to be an optimum amount of dispersing agent to be employed for obtaining a minimum particle size and amounts of dispersing agent above or below this optimum amount produce polymers having a larger particle size. It is usually preferred to employ the smallest amount of dispersing agent that will produce polymers of the desired particle size.

It is possible and sometimes desirable to employ two or more different dispersing agents in the process of this invention, at least one of said dispersing agents being a water-soluble interpolymer of the type previously described. Particularly good results are obtained with binary dispersing agent systems in which the second dispersing agent is a bis(sulfoaryl) alkane or preferably a water-soluble salt thereof such as an alkali metal, ammonium or amine salt. Typical examples of such bis(sulforayl) alkanes include bis(sulfophenyl) methane, bis(sulfotolyl) methane, bis(sulfonaphthyl) methane, 1,1-bis(sulfophenyl) ethane, 2,2-bis(sulfonaphthyl) propane, etc. Such bis(sulfoaryl) alkanes are normally employed in concentrations of the same order of magnitude as the water-soluble interpolymer suspending agents.

In carrying out the suspension polymerization step, it is usually preferred to maintain the pH of the aqueous dispersing medium below about 7.0. The water-soluble interpolymer dispersing agents contain carboxyl groups and, when employed at the preferred levels, will lower the pH of the aqueous dispersing medium to the approximate range of 3.0–4.0, which is close to the optimum pH. If desired, small quantities of inorganic salts may be included in the aqueous medium to suppress emulsification of the polymer.

The compositions which may be polymerized by the method of this invention comprise solutions of a rubbery conjugated 1,3-diene polymer in a vinylidene aromatic hydrocarbon or ring-halogenated vinylidene aromatic hydrocarbon monomer or a monomer mixture consisting predominantly of a vinylidene aromatic hydrocarbon or a ring-halogenated vinylidene aromatic hydrocarbon. Although vinylidene monomer solutions containing minor amounts of a rubbery conjugated 1,3-diene polymer, e. g., less than 1%, may be polymerized by the process of the invention, the optimum value of the process is obtained in polymerizing vinylidene monomer solutions containing substantial amounts of the rubbery conjugated 1,3-diene polymer, e. g., more than 2% and more especially more than 5% of the rubbery conjugated 1,3-diene polymer. The process has been employed successfully to polymerize styrene monomer having as much as 25 weight percent of a rubbery butadiene-styrene interpolymer dissolved therein. The upper limit on the rubbery conjugated 1,3-diene polymer content will be set primarily by the viscosity of the partially polymerized vinylidene monomer solution.

The rubbery conjugated 1,3-diene polymer component of the polymerizable mixture may be essentially any rubbery conjugated 1,3-diene polymer having a brittle temperature of 0° C. or less, said brittle temperature being determined by ASTM Test procedure D746–52T. Typical examples of such polymers include natural rubber itself, synthetic polyisoprene, polybutadiene, interpolymers of butadiene and/or isoprene with styrene, acrylonitrile, acrylate esters, etc.

The monomeric component of the polymerizable mixture may consist of (1) a vinylidene aromatic hydrocarbon or ring-halogenated vinylidene aromatic hydrocarbon such as styrene; vinyl naphthalene; ring-substituted alkylstyrenes, e. g., vinyl toluene, o-ethylstyrene, p-ethylstyrene, 2,4-dimethylstyrene, etc.; ring-substituted halostyrenes, e. g., o-chlorostyrene, p-chlorostyrene, o-bromostyrene, 2,4-dichlorostyrene, etc.; ring-substituted alkyl-, ring-substituted halostyrenes, e. g., 2-chloro-2-methylstyrene, 2,6-dichloro-4-methylstyrene, etc.; (2) a mixture of two or more vinylidene aromatic hydrocarbons or a ring-halogenated vinylidene aromatic hydrocarbon, which mixture may include a vinylidene aromatic hydrocarbon which will not readily homopolymerize, e. g., alpha-methylstyrene or (3) a mixture of a major amount of a vinylidene aromatic hydrocarbon or ring-halogenated vinylidene aromatic hydrocarbon with a minor amount of a vinylidene monomer interpolymerizable therewith. Examples of such interpolymerizable vinylidene monomers include conjugated 1,3-dienes, e. g., butadiene, isoprene, etc., alpha,beta-unsaturated monobasic acids and derivatives thereof, e. g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc.

In addition to the rubbery conjugated 1,3-diene polymer and the vinylidene aromatic hydrocarbon or ring-halogenated vinylidene aromatic hydrocarbon monomer, the polymerizable mixtures may also contain free radical generating polymerization initiators, anti-oxidants, plasticizers, heat and light stabilizers, polymerization modifiers, colorants, etc.

The above descriptions and particularly the examples are set forth by way of illustration only. Many other variations and modifications thereof will be apparent to those skilled in the art and can be made without departing from the spirit and scope of the invention herein described.

What is claimed is:

1. A process for preparing polymerization products in granular form which comprises (1) agitating and heating a mixture of at least about 35 parts of water and 100 parts of a partially polymerized solution of a rubbery conjugated 1,3-diene polymer in a vinylidene monomer of the group consisting of a vinylidene aromatic hydrocarbon monomer, a ring-halogenated vinylidene aromatic hydrocarbon monomer and mixtures thereof to a temperature of at least about 110° C., in absence of a dispersing agent, (2) adding to said mixture of water and partially polymerized vinylidene aromatic hydrocarbon monomer solution, as a dispersing agent, a water-soluble interpolymer consisting of 93.5–98.5 mol percent of an acidic monomer of the group consisting of acrylic acid, methacrylic acid and mixtures thereof, and, correspondingly, 6.5–1.5 mol percent of a monomer of the group consisting of 2-ethylhexyl acrylate, 2-ethylhexyl methacrylate and mixtures thereof, and (3) continuing to agitate and heat said water and partially polymerized vinylidene aromatic hydrocarbon monomer solution until said vinylidene aromatic hydrocarbon monomer is substantially completely polymerized; the vinylidene aromatic hydrocarbon monomer solution employed in step (1) being characterized by the fact that at least about 15% of the monomeric constituents of the vinylidene aromatic hydrocarbon monomer solution have been polymerized and that said partially polymerized vinylidene aromatic hydrocarbon monomer solution has a viscosity of at least about 40 poises at 40° C.

2. A process as in claim 1 in which the dispersing agent added in step (2) is a water-soluble interpolymer of acrylic acid and 2-ethylhexyl acrylate.

3. A process as in claim 2 in which the rubbery polymer of a conjugated 1,3-diene is an interpolymer of 1,3-butadiene and styrene.

4. A process as in claim 2 in which the monomer employed comprises a mixture of a major amount of styrene and a minor amount of alpha methylstyrene.

5. A process as in claim 2 in which the monomer employed comprises a mixture of a major amount of styrene and a minor amount of acrylonitrile.

6. A process as in claim 2 in which the monomer employed is styrene.

No references cited.